US012562183B2

(12) United States Patent
Zhang et al.

(10) Patent No.: US 12,562,183 B2
(45) Date of Patent: Feb. 24, 2026

(54) DEEP LEARNING FOR JOINT ACOUSTIC ECHO AND ACOUSTIC HOWLING SUPPRESSION IN HYBRID MEETINGS

(71) Applicant: TENCENT AMERICA LLC, Palo Alto, CA (US)

(72) Inventors: Hao Zhang, Columbus, OH (US); Meng Yu, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 281 days.

(21) Appl. No.: 18/319,039

(22) Filed: May 17, 2023

(65) Prior Publication Data

US 2024/0386905 A1 Nov. 21, 2024

(51) Int. Cl.

| | |
|---|---|
| ***G10L 25/30*** | (2013.01) |
| ***G10L 21/0264*** | (2013.01) |
| ***G10L 21/0308*** | (2013.01) |
| ***G10L 25/06*** | (2013.01) |
| ***G10L 25/21*** | (2013.01) |
| *G10L 21/0208* | (2013.01) |

(52) U.S. Cl.

CPC .......... *G10L 25/30* (2013.01); *G10L 21/0264* (2013.01); *G10L 21/0308* (2013.01); *G10L 25/06* (2013.01); *G10L 25/21* (2013.01); *G10L 2021/02082* (2013.01)

(58) Field of Classification Search

CPC . G10L 25/30; G10L 21/0264; G10L 21/0308; G10L 25/06; G10L 25/21

See application file for complete search history.

(56) References Cited

U.S. PATENT DOCUMENTS

| | | | | |
|---|---|---|---|---|
| 8,213,598 | B2 * | 7/2012 | Bendersky ............... | H04B 3/23 379/406.13 |
| 11,250,833 | B1 | 2/2022 | Bajic et al. | |
| 2018/0090152 | A1 * | 3/2018 | Ichimura ............. | G10L 21/0216 |
| 2020/0294508 | A1 * | 9/2020 | Kwasiborski ........ | H04R 25/405 |
| 2021/0390946 | A1 | 12/2021 | Wang et al. | |
| 2022/0215853 | A1 | 7/2022 | Zhang et al. | |

(Continued)

OTHER PUBLICATIONS

International Search Report issued Jan. 23, 2024 in International Application No. PCT/US 23/32739.

(Continued)

*Primary Examiner* — Richemond Dorvil
*Assistant Examiner* — Ethan Daniel Kim
(74) *Attorney, Agent, or Firm* — Sughrue Mion, PLLC

(57) ABSTRACT

Method, apparatus, and non-transitory storage medium for training a deep neural-network model jointly for acoustic echo suppression and acoustic howling suppression are provided. The method may include generating a teacher speech signal for training the deep neural-network model based on a input speech from a speech system and at least one reference signal. The deep neural-network model is trained jointly for both acoustic echo suppression and acoustic howling suppression by using the teacher speech signal and a correlation loss. During training of the deep neural-network model, the training task formulates a recurrent feedback suppression process as an instantaneous speech separation task using the teacher-forced training strategy.

17 Claims, 8 Drawing Sheets

(56) References Cited

U.S. PATENT DOCUMENTS

| | | | |
|---|---|---|---|
| 2023/0046518 | A1 | 2/2023 | Gao et al. |
| 2023/0096876 | A1 | 3/2023 | Yu et al. |

OTHER PUBLICATIONS

Written Opinion issued Jan. 23, 2024 in International Application No. PCT/US 23/32739.

Hao Zhang, et al., " Deep Learning for Joint Acoustic Echo and Acoustic Howling Suppression in Hybrid Meetings", arXiv:2305.01637v2 [eess.AS], May 4, 2023 (5 pages total).

* cited by examiner

300

330

350

400

DEEP LEARNING FOR JOINT ACOUSTIC ECHO AND ACOUSTIC HOWLING SUPPRESSION IN HYBRID MEETINGS

BACKGROUND

Hybrid meetings, which involve a combination of in-person and remote participants, have become increasingly necessary. As of 2022, a significant proportion of workplaces (some estimate as much as 78%) have adopted hybrid work strategies, indicating a growing trend towards hybrid work as the future of work. Hybrid meetings, while providing conveniences, have brought new challenges, especially challenges associated with large scale audio and video communication both live and virtually.

Despite the benefits of hybrid meetings, audio-related problems such as acoustic echo and acoustic howling can pose significant challenges and need to be addressed to ensure full-duplex communication. In particular, the interplay between acoustic echo and acoustic howling in a hybrid meeting makes the joint suppression of both difficult.

Acoustic echo refers to the phenomenon where sound originating from a speaker on one end of a communication system is captured by the microphone on the other end and subsequently replayed back to the speaker, creating an unwanted echoing effect. Acoustic howling arises when sound from the speaker's end is captured by the microphone on the same end, leading to a feedback loop that amplifies the sound until it becomes unbearable. Despite having similar underlying mechanisms, acoustic echo and howling are distinct problems, and they can be particularly challenging to address in hybrid meetings where both issues can occur simultaneously. The presence of one problem can affect the estimation and suppression of the other, making it difficult for conventional algorithms to effectively suppress both echo and howling jointly.

Therefore, it is crucial to have robust and effective solutions that can address both acoustic echo cancellation (AEC) and acoustic howling suppression (AHS) in a joint manner, taking into account the complex acoustics of the hybrid meeting environment.

SUMMARY

According to embodiments, a method for acoustic echo suppression and acoustic howling suppression may be provided. The method may include generating a teacher speech signal for training the deep neural-network model based on a input speech from a speech system and at least one reference signal; and training the deep neural-network model jointly for acoustic echo suppression and acoustic howling suppression based on the teacher speech signal and a correlation loss, wherein the deep neural-network model is trained by treating the teacher speech signal as speech to be separated.

According to embodiments, the method may also include generating the teacher speech signal which may include receiving a training speech signal, the training speech signal comprising training target speech, a first reference signal, and a second reference signal; based on the training speech signal, generating normalized log-power spectra (LPS) associated with the training speech signal, correlation matrix across time and frequency associated with the training speech signal, and channel covariance associated with the training speech signal; concatenating the normalized log-power spectra (LPS) associated with the training speech signal, the correlation matrix across time and frequency associated with the training speech signal, and the channel covariance associated with the training speech signal; generating intermediate training target speech, intermediate first reference signal, and intermediate second reference signal based on the concatenation; and generating the teacher speech signal based on the training speech signal, the intermediate training target speech, the intermediate first reference signal, and the intermediate second reference signal.

According to embodiments, an apparatus for training a deep neural-network model jointly for acoustic echo suppression and acoustic howling suppression may be provided. The apparatus may include at least one memory configured to store program code; and at least one processor configured to read the program code and operate as instructed by the program code. The program may include first generating code configured to cause the at least one processor to generate a teacher speech signal for training the deep neural-network model based on a input speech from a speech system and at least one reference signal; and first training code configured to cause the at least one processor to train the deep neural-network model jointly for acoustic echo suppression and acoustic howling suppression based on the teacher speech signal and a correlation loss, wherein the deep neural-network model is trained by treating the teacher speech signal as speech to be separated.

According to embodiments, the first generating code may include first receiving code configured to cause the at least one processor to receive a training speech signal, the training speech signal comprising training target speech, a first reference signal, and a second reference signal; second generating code configured to cause the at least one processor to generate, based on the training speech signal, normalized log-power spectra (LPS) associated with the training speech signal, correlation matrix across time and frequency associated with the training speech signal, and channel covariance associated with the training speech signal; and concatenating code configured to cause the at least one processor to concatenate the normalized log-power spectra (LPS) associated with the training speech signal, the correlation matrix across time and frequency associated with the training speech signal, and the channel covariance associated with the training speech signal; third generating code configured to cause the at least one processor to generate intermediate training target speech, intermediate first reference signal, and intermediate second reference signal based on the concatenation; and fourth generating code configured to cause the at least one processor to generate the teacher speech signal based on the training speech signal, the intermediate training target speech, the intermediate first reference signal, and the intermediate second reference signal.

According to embodiments, a non-transitory computer-readable medium storing instructions may be provided. The instructions, when executed by at least one processor for training a deep neural-network model jointly for acoustic echo suppression and acoustic howling suppression, may cause the one or more processors to generate a teacher speech signal for training the deep neural-network model based on a input speech from a speech system and at least one reference signal; and train the deep neural-network model jointly for acoustic echo suppression and acoustic howling suppression based on the teacher speech signal and a correlation loss, wherein the deep neural-network model is trained by treating the teacher speech signal as speech to be separated.

According to embodiments, generating the teacher speech signal may include receive a training speech signal, the training speech signal comprising training target speech, a first reference signal, and a second reference signal; based on the training speech signal, generate normalized log-power spectra (LPS) associated with the training speech signal, correlation matrix across time and frequency associated with the training speech signal, and channel covariance associated with the training speech signal; and concatenate the normalized log-power spectra (LPS) associated with the training speech signal, the correlation matrix across time and frequency associated with the training speech signal, and the channel covariance associated with the training speech signal; generate intermediate training target speech, intermediate first reference signal, and intermediate second reference signal based on the concatenation; and generate the teacher speech signal based on the training speech signal, the intermediate training target speech, the intermediate first reference signal, and the intermediate second reference signal.

DETAILED DESCRIPTION

Embodiments of the present disclosure relate to methods, apparatus, and systems for training a deep neural-network model jointly for acoustic echo suppression and acoustic howling suppression. Embodiments of this disclosure relate to a deep learning approach to jointly tackle acoustic echo suppression and acoustic howling suppression by formulating a recurrent feedback suppression process as an instantaneous speech separation task using the teacher-forced training strategy. Specifically, a self-attentive recurrent neural network may be utilized to extract target speech from microphone recordings with accessible and learned reference signals, thus suppressing acoustic echo and acoustic howling simultaneously. Different combinations of input signals and loss functions may be used improved performance.

As stated above, it is difficult for conventional algorithms to effectively suppress both echo and howling jointly. Recent related art has leveraged deep learning as a promising approach for solving the challenges of AEC and AHS due to its ability to model complex nonlinear relationships. In AEC, the problem can be directly formulated as a supervised speech separation problem. However, AHS poses a more complex challenge since it involves the recursively amplification of the playback signal, which makes formulating it as a supervised learning problem non-trivial.

Therefore, to address this challenge, the present disclosure proposes a deep learning based AEC and AHS using a teacher-forced training strategy, resulting in improved performance when compared to baselines, jointly address AEC and AHS, and solving the full-duplex communication problem in hybrid meetings.

The present disclose tackles the challenges posed by joint AEC and AHS by considering them as an integrated feedback suppression problem and proposes a deep learning approach to address it. The recursive feedback suppression process may be converted to a speech separation process through teacher forcing training strategy, which may simplify the problem formulation and accelerate model training. As an example, a self-attentive recurrent neural network (SARNN) may be utilized to extract target speech from microphone signal with multiple reference signals as additional inputs. Given the difficulties in suppressing both forms of feedback jointly, a specific loss function is provided to mitigate leakage introduced due to improperly suppressed feedback, with results demonstrating its efficacy.

Figure 1:
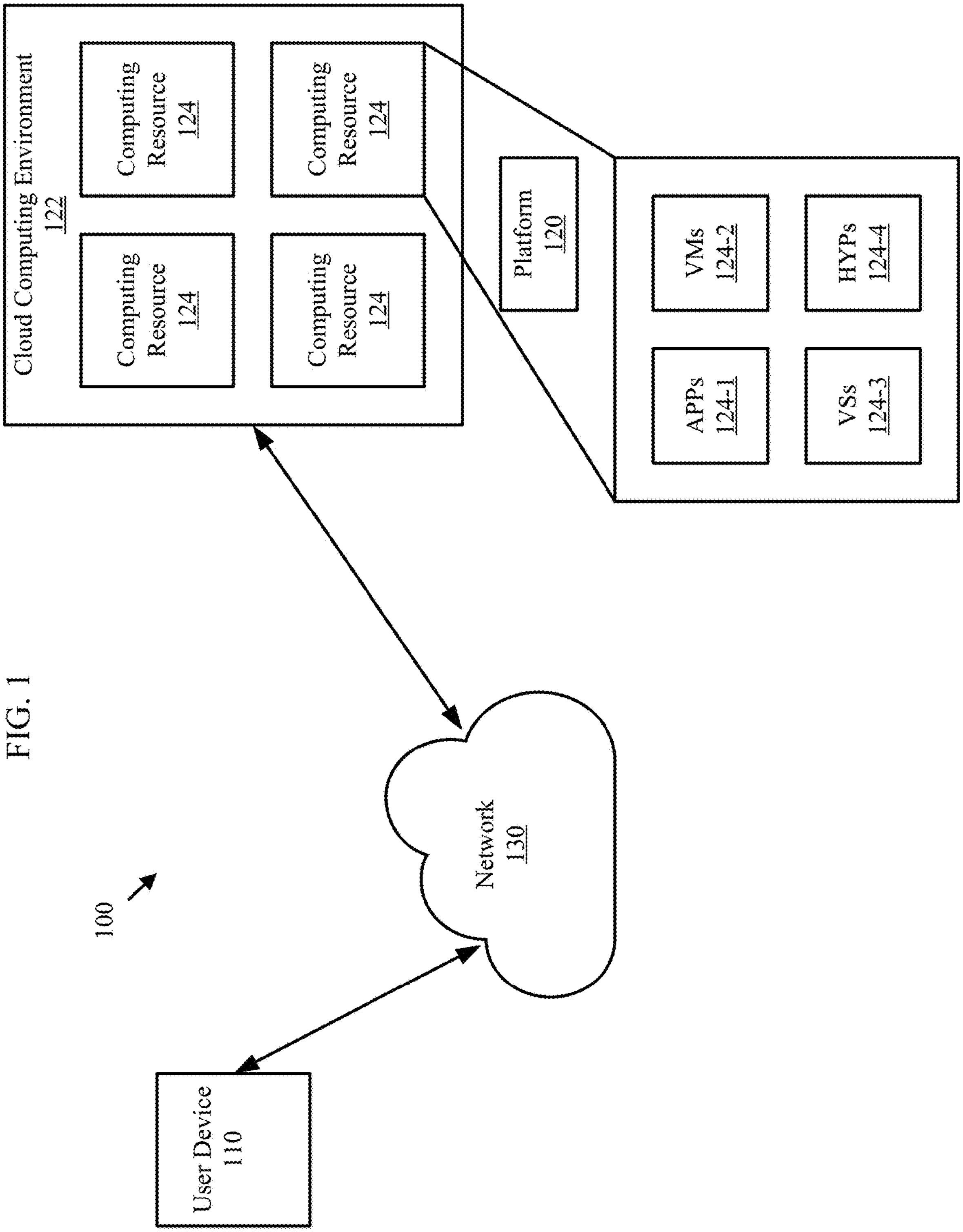
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124

(referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
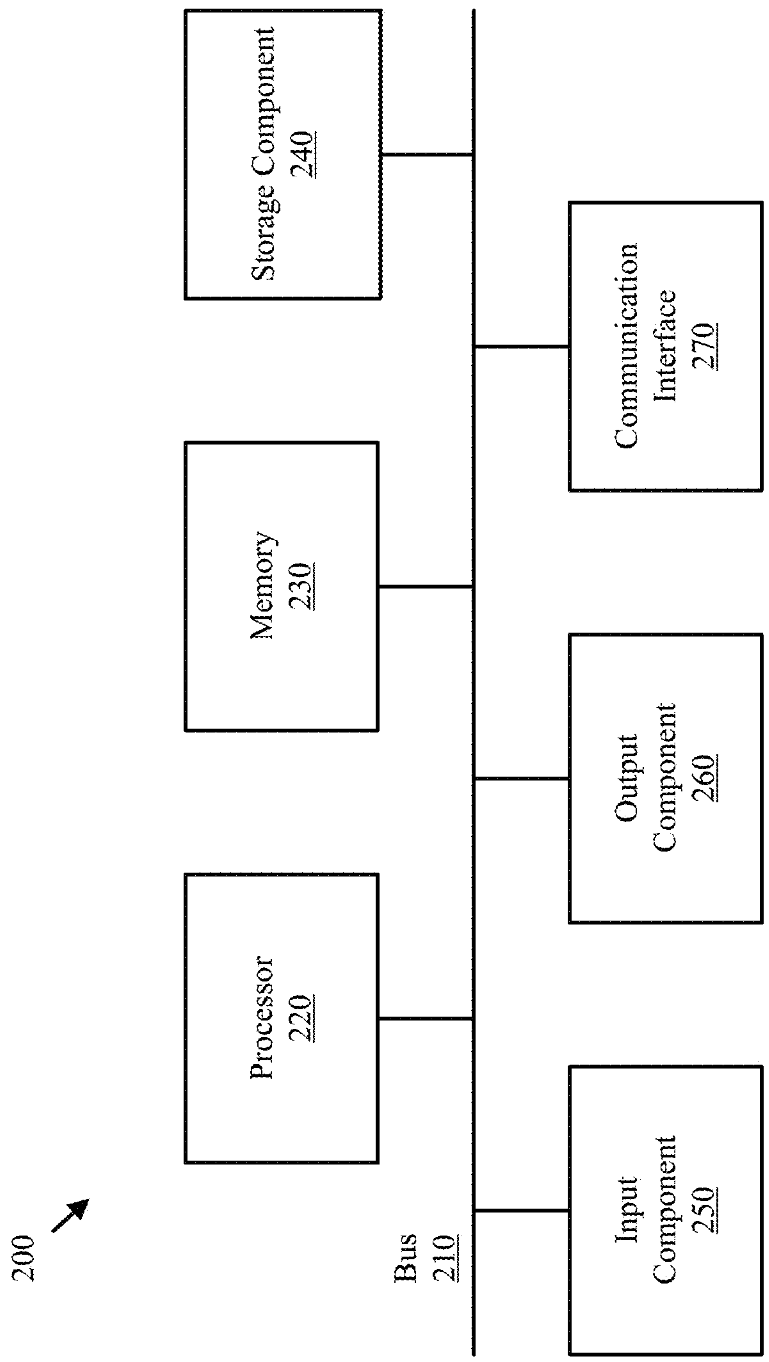
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
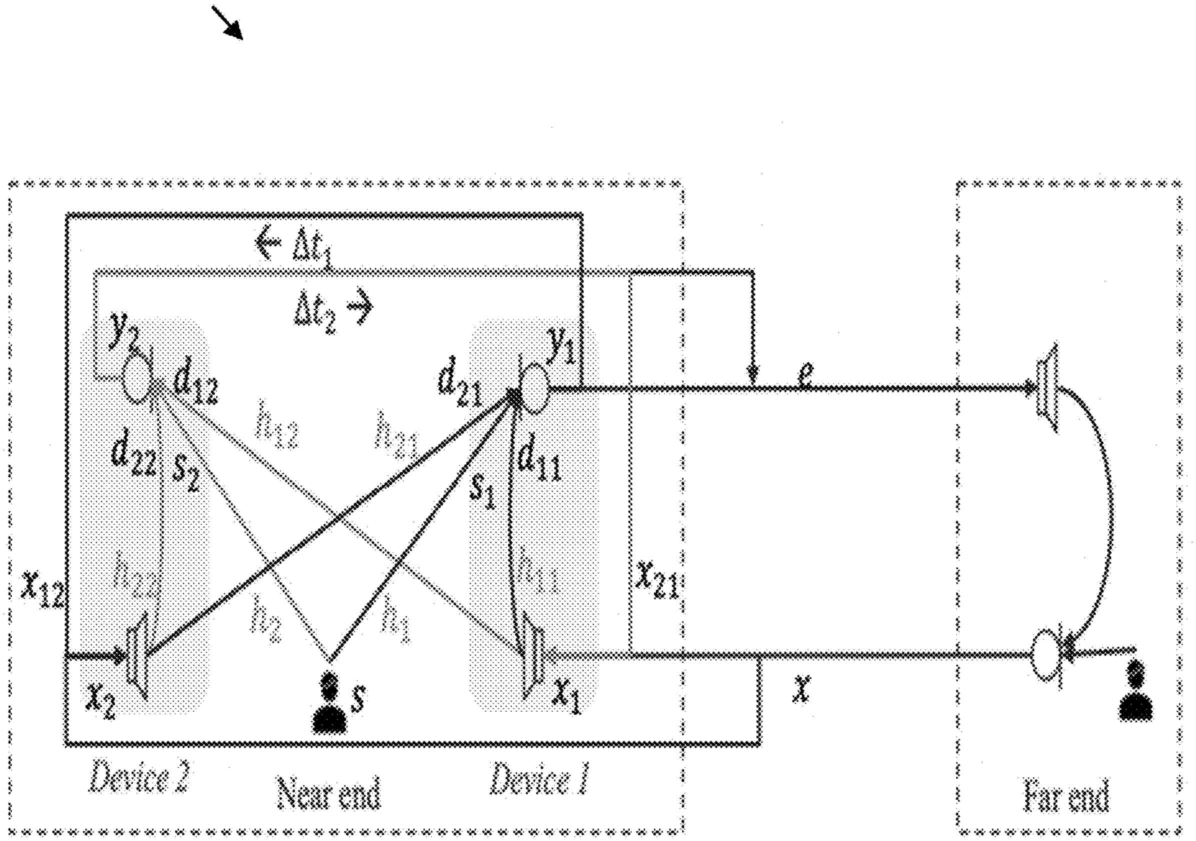
FIG. 3A is a signal diagram of an exemplary hybrid meeting system, according to embodiments.

FIG. 3A is a signal diagram of a hybrid meeting system 300 according to embodiments of the present disclosure. The hybrid meeting system includes a device 1, device 2, with device 1 and device 2 being at the near end of the hybrid meeting system (e.g., the room where the hybrid meeting is physically located). The hybrid meeting system 300 also includes an audience or participants at the far end of the hybrid system (e.g., participants attending the hybrid meeting virtually).

For hybrid meeting system with/devices (e.g., device 1, device 2, etc.) on the same end and all of them may have both a loudspeaker and a microphone turned on, then the total number of acoustic paths in the system will be $J^2$. As an example, in FIG. 3A, a simplified hybrid meeting system 300 with two devices is provided. While capturing the target speech $s_i$, the microphone on device i may also record the background noise $n_i$, and playback signals from all devices:

$$y_i = s_i + n_i + \sum_{j=1}^{2} d_{ji} = s_i + n_i + \sum_{j=1}^{2} (x_j * h_{ji}) \quad \text{Eqn (1)}$$

where $x_j$ is the loudspeaker signal on device j, and $d_{ji}$ is the signal picked up by microphone i from loudspeaker j through the acoustic path $h_{ji}$. Among these playback signals, $d_{ii}$ is the playback from device i's own loudspeaker to its microphone, which is known as acoustic echo. Compared to $d_{ji}$ ($j \neq i$), acoustic echo ($d_{ii}$) is relatively easier to suppress since each device usually only has access to its own loudspeaker signal $x_i$, which can be used as a reference signal during the attenuation of $d_{ii}$.

Challenges arise when speakers on the far end and near end talk simultaneously. Considering that each device cannot distinguish whether other devices are exposed in the same space or not, each device treats all other devices as far end and sends its processed signal to them. The loudspeaker signal $x_i$ will then be a combination of the far-end signal x and the processed signals sent to device i from device j (denoted as $x_{ji}$ ($j \neq i$),):

$$x_i = x + x_{ji}, \ (j \neq i) \quad \text{Eqn (2)}$$

If feedback suppression module on each device works properly, the resulting processed signal, $x_{ji}$, should resemble a delayed, scaled, and reverberant version of the near end speech s. From the perspective of signal sources, microphone signal given in (1) can be rewritten as:

$$y_i = s_i + n_i + \sum_{j=1}^{2} d_{ji}^{x} + \sum_{j=1}^{2} d_{ji}^{s} \quad \text{Eqn (3)}$$

Where $d_{ji}^{x}$ and $d_{ji}^{s}$ represent the playback components originated from x and s, respectively. It is more challenging to suppress $d_{ji}^{s}$ because it comes from the same source as that of the target speech $s_i$, and reducing it could distort the target signal.

Figure 3B:
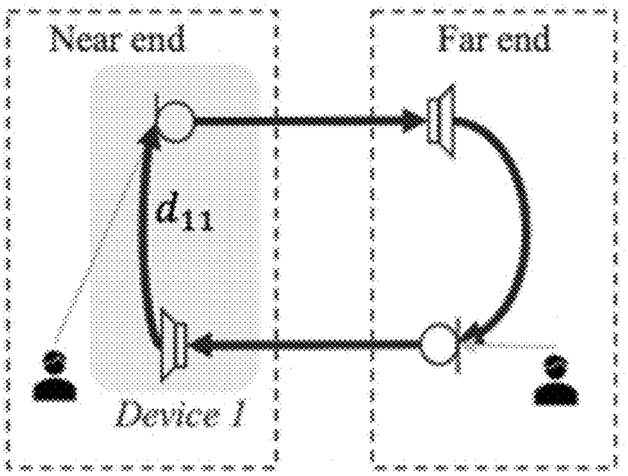
FIGS. 3B-3C are signal diagrams of closed acoustic loops related to one or more devices in FIG. 3A.
Figure 3C:
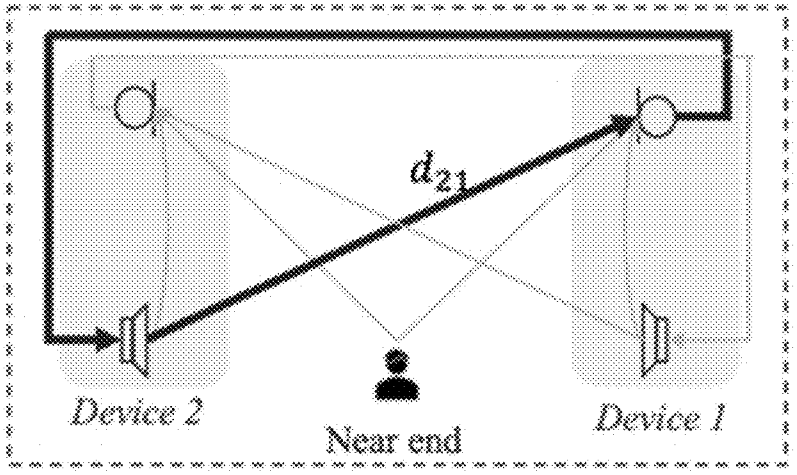

There may be two closed acoustic loops (CAL) per device in the system that can cause acoustic howling. As an example, as shown in FIG. 3B-3C, device 1 has two closed acoustic loops (CAL) which need to be analyzed the audio-related problem in a hybrid meeting system. The first CAL, as shown in FIG. 3B, due to acoustic echo, is easier to handle since acoustic echo occurs once per transmission and is handled on both ends. The second CAL, as shown in FIG. 3B, is more challenging for at least two reasons: 1) device 1 lacks access to the reference signal that causes feedback $d_{21}$; and 2) the two devices involved in the second CAL are exposed in the same space.

Without any processing, the microphone signal may be played out through loudspeaker and repeatedly re-enter the pickup. The microphone signal $y_1$ at time index t can then be represented as:

$$y_1(t) = s_1(t) + n_1(t) + d_{11}(t) + NL[(y_1(t - \Delta t) + x(t)) \cdot G_2] * h_{21}(t) \quad \text{Eqn (4)}$$

where $\Delta t_1$ denotes the system delay from device 1 to device 2, $G_2$ is the gain of amplifier on device 2, and NL(•) the non-linear function of loudspeaker. Playback $d_{11}(t)$ is the acoustic echo. The recursive relationship between $y_1(t)$ and $y_1(t-\Delta t)$ causes re-amplifying of playback signal and leads to an annoying, high-pitched sound, which is known as acoustic howling.

In hybrid meetings, achieving full-duplex communication requires addressing both AEC and AHS simultaneously. Nonetheless, the presence of either issue can hinder the accurate detection and elimination of the other, resulting in a shortage of effective solutions.

To address the recursive nature of howling, a deep neural network (DNN) module may be integrated into the closed acoustic loop and trained recursively. However, this may not practical because to its high computational cost. As a solution, a teacher forcing training strategy can be used to formulate the joint AEC and AHS task as a general feedback suppression problem which may in turn reduce computational costs associated with the AEC and AHS tasks.

Figure 4:
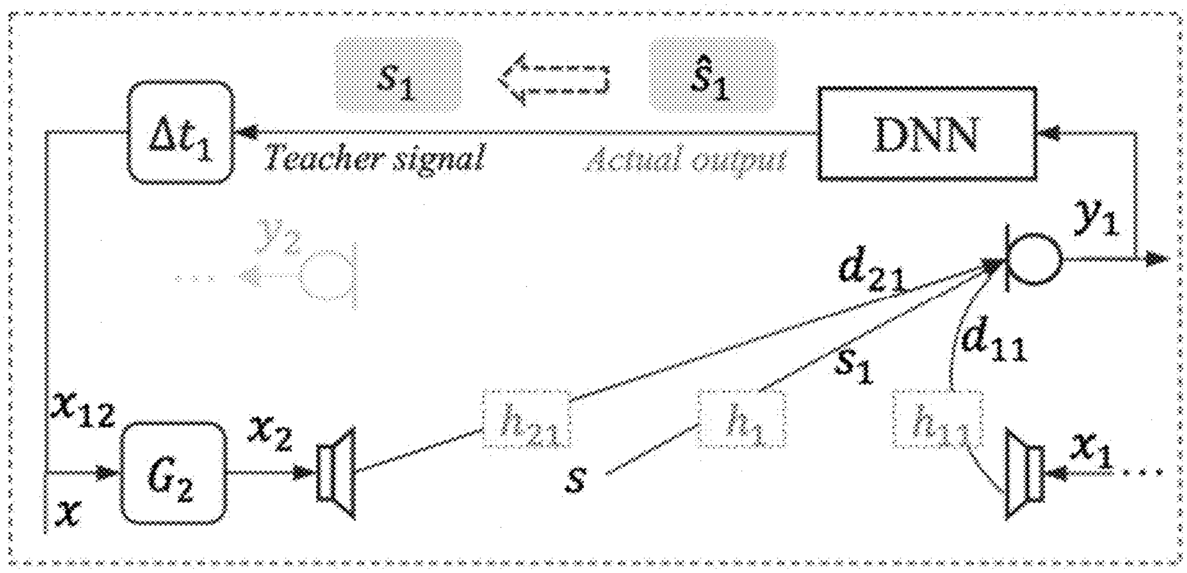
FIG. 4 is an exemplary signal flow diagram of an exemplary implementation of teacher-forced learning (teaching or training) strategy, according to embodiments.

FIG. 4 illustrates an signal flow diagram 400 of an implementation of teacher-forced learning (teaching or training) strategy.

The teacher-forced learning strategy is based on the assumption that the DNN model, once properly trained, can attenuate all feedback signals ($d_{11}$ and $d_{21}$) and transmit only the target speech $s_1$. Through teacher-forced learning, the actual output $\hat{s}_1$ is replaced with the teacher signal $s_1$ during model training. As a result, rather than generated recursively, the microphone signal (4) is simplified to a mixture of target signal, background noise, acoustic echo, and an one-time playback signal determined by $s_1$:

$$y_1(t) = s_1(t) + n_1(t) + d_{11}(t) + NL[(s_1(t-\Delta t_1) + x(t))\cdot G_2] * h_{21}(t) \quad \text{Eqn (5)}$$

And the overall problem is thus formulated as a speech separation problem during model training where the task is to separate target signal from the microphone recording with accessible loudspeaker signals ($x_1$, and/or x, $x_{21}$) as references.

Appropriate reference signals, which enable accurate estimation of the playback signals, are crucial for AEC and AHS algorithms. The reference signal for device 1 may be a mixture of two signals. The most direct approach is to use the integrated signal $x_1$ as a reference for suppressing the two feedback signals $d_{11}$ and $d_{21}$ in $y_1$. However, this may be less effective for suppressing $d_{21}$. Known from Eqn (3) that the playback signals share common components originating from different sound sources. Depending on the design of the audio system, access to to x and $x_{21}$ may be available in addition to the integrated loudspeaker signal $x_1$. Using separated loudspeaker signals (x and $x_{21}$) as references could make the suppression of both feedbacks more efficient.

While these reference signals may be obtained directly from device, in addition to or alternatively, a DNN may include components to estimate some intermediate outputs from the inputs and use them as non-linear reference signals to further improve feedback cancellation performance.

Figure 5:
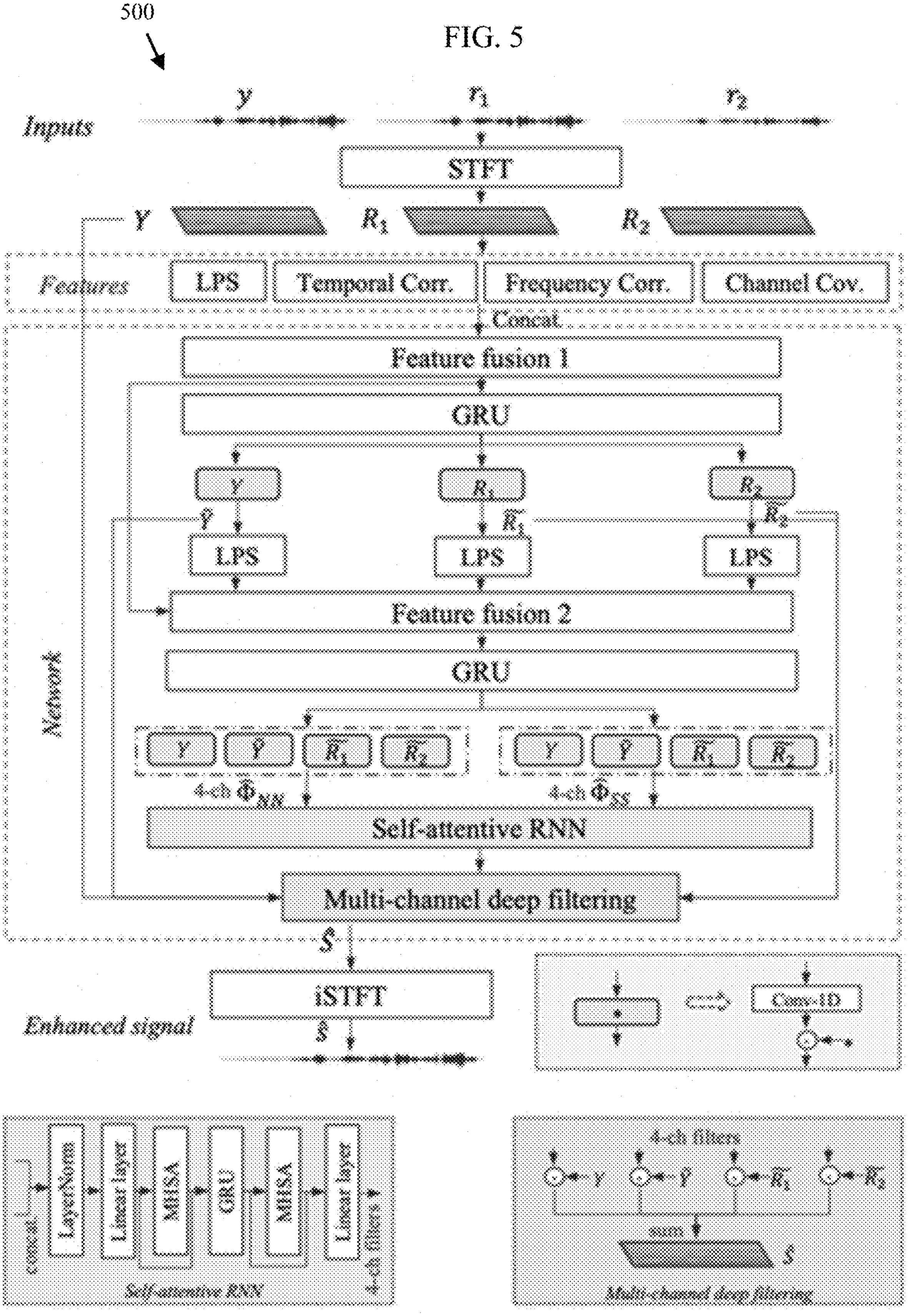
FIG. 5 is an exemplary block diagram of a deep neural-network model jointly for acoustic echo suppression and acoustic howling suppression, according to embodiments.

FIG. 5 is architecture diagram 500 of a DNN module for joint acoustic echo and howling suppression.

Architecture diagram 500 has a microphone signal y and one or two reference signals (represented as $r_1$ and $r_2$) as inputs. The input signals, may be sampled at 16 kHz, and may be transformed into the frequency domain using a 512-point short-time Fourier transform (STFT) with a frame size of 32 ms and frame shift of 16 ms. The resulting frequency domain inputs are labeled as Y, $R_1$, and $R_1$, respectively.

To extract more information from inputs and facilitate the suppression of playback signals, the input feature for the DNN may be a concatenation of the normalized log-power spectra (LPS), correlation matrix across time frames and frequency bins, and channel covariance of input signals. These intermediate features may be concatenated and then passed through a linear layer for feature fusion, followed by a gated recurrent unit (GRU) layer with 257 hidden units and three 1D convolution layers to estimate three complex-valued filters. The filters may then be applied to the inputs through deep filtering to obtain the corresponding intermediate signals, $\tilde{Y}$, $\tilde{R}_1$, and $\tilde{R}_2$. These signals serve as additional nonlinear reference signals and their LPS are then concatenated with the original fused feature, and another linear layer is used for feature fusion.

In the initial stage of training the DNN, according to an aspect of the present disclosure, a combination of time-domain scale-invariance signal-to-distortion ratio (SI-SDR) loss and frequency-domain mean absolute error (MAE) of spectrum magnitude may be used as loss function for model training:

$$\text{Loss}_1 = -\text{SI-SDR}(\hat{s}, s) + \lambda\,\text{MAE}(|\hat{S}|, |S|) \quad \text{Eqn (6)}$$

Given that the feedback signals have a strong correlation with the target signal, suppressing them could be difficult. To further suppress the leakage introduced due to improperly attenuated playback signals, we propose to include a correlation loss:

$$\text{Loss}_{corr} = [1 - corr(\hat{s}_1, s_1)] + corr(\hat{s}_1 - s_1, d_*) \quad \text{Eqn (7)}$$

The correlation loss may be composed of two terms. The first term may evaluate the similarity between the estimated and target signals, while the second term may evaluate the similarity between a playback signal $d_*$ and the residual signal in the estimated target. The modified loss function we used for model training is:

$$\text{Loss}_2 = \text{Loss}_1 + \beta\,\text{Loss}_{corr} \quad \text{Eqn (8)}$$

Any suitable values of λ and γ may be used to ensure balance among different losses. As an example, λ and γ may be set to 10000 and 10, respectively.

Next, an SARNN module may be used to estimate a four-channel enhancement filter, which may then be applied on the microphone signal and the three learned reference signals to obtain the enhanced target signal $\hat{S}_1$. Finally, an inverse STFT (iSTFT) may be used to obtain the waveform $\hat{s}_1$.

Thus, a deep learning based method for addressing audio-related problems in hybrid meetings is proposed. The method treating to acoustic echo and acoustic howling as an integrated feedback problem and to achieve simultaneous AEC and AHS using a teacher-forcing learning strategy. By converting the recursive feedback suppression problem into a speech separation problem, an SARNN model may be utilized to extract the target speech from microphone recording with multiple reference signals as additional inputs.

Embodiments of this disclosure relate to using reference signals learnt for the DNN model because learnt reference signal help improve the performance for the AEC task. Considering the similarities between acoustic echo and acoustic howling, using learnt reference signal(s) is beneficial for suppressing acoustic howling (or/and acoustic echo) as well and computationally efficient.

In FIG. 5, a "Conv-1D" outputs a complex-valued ratio filter, which is then applied upon signal * through deep filtering, denoted as ⊙. The intermediate signals mentioned herein may be obtained by applying a filtering to the corresponding original inputs. Specifically, multiple Conv-1D layers may be applied to learn a complex-valued ratio filter and apply it upon the corresponding input signal through deep filtering. The LPS feature of these intermediate signals, together with the original feature may be used for training the following model. In addition, these intermediate signals may be used later for estimating multi-channel noise and speech covariance matrix, are then used for multi-channel deep filtering for obtaining an estimate of the target signal.

Figure 6:
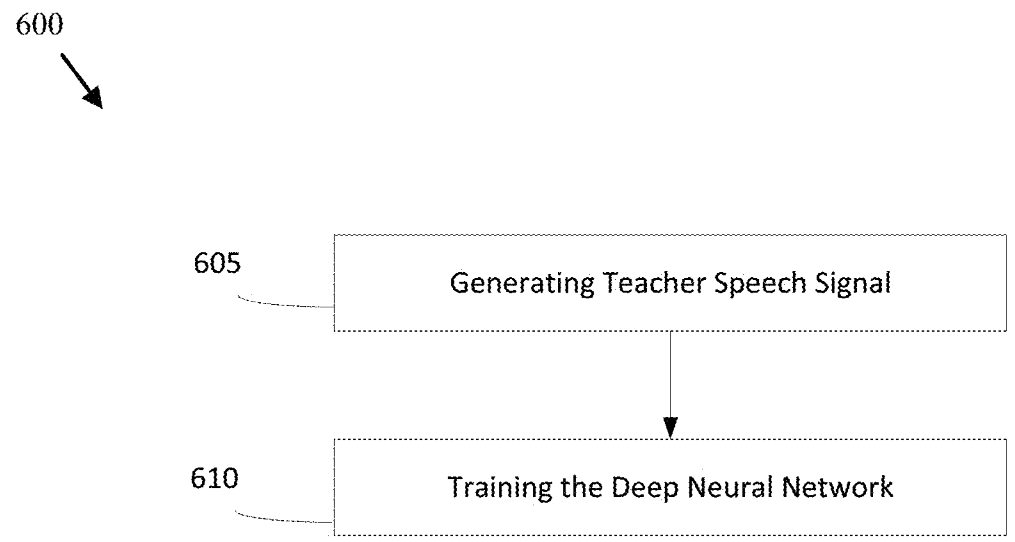
FIG. 6 illustrate flowchart for training a deep neural-network model jointly for acoustic echo suppression and acoustic howling suppression, according to embodiments.

FIG. 6 is a flow diagram 600 illustrating a process for training a deep neural-network model jointly for acoustic echo suppression and acoustic howling suppression according to embodiments.

At operation 605, a teacher speech signal may be generated for training the deep neural-network model based on a input speech from a speech system and at least one reference signal.

In some embodiments, generating the teacher training signal may include receiving a training speech signal, the training speech signal comprising training target speech, a first reference signal, and a second reference signal, based on the training speech signal, generating normalized log-power spectra (LPS) associated with the training speech signal, correlation matrix across time and frequency associated with the training speech signal, and channel covariance associated with the training speech signal, and concatenating the normalized log-power spectra (LPS) associated with the training speech signal, the correlation matrix across time and frequency associated with the training speech signal, and the channel covariance associated with the training speech signal.

In some embodiments, it may further include generating intermediate training target speech, intermediate first reference signal, and intermediate second reference signal based on the concatenation and generating the teacher speech signal based on the training speech signal, the intermediate training target speech, the intermediate first reference signal, and the intermediate second reference signal.

At operation 610, the deep neural-network model may be trained jointly for acoustic echo suppression and acoustic howling suppression based on the teacher speech signal and a correlation loss, wherein the deep neural-network model is trained by treating the teacher speech signal as speech to be separated.

In some embodiments, the training may be based on a correlation loss function. The correlation loss may include a first measure of a first similarity between an estimated target speech and the input speech and a second measure of a second similarity between at least one estimated reference signal and the at least one reference signal.

The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
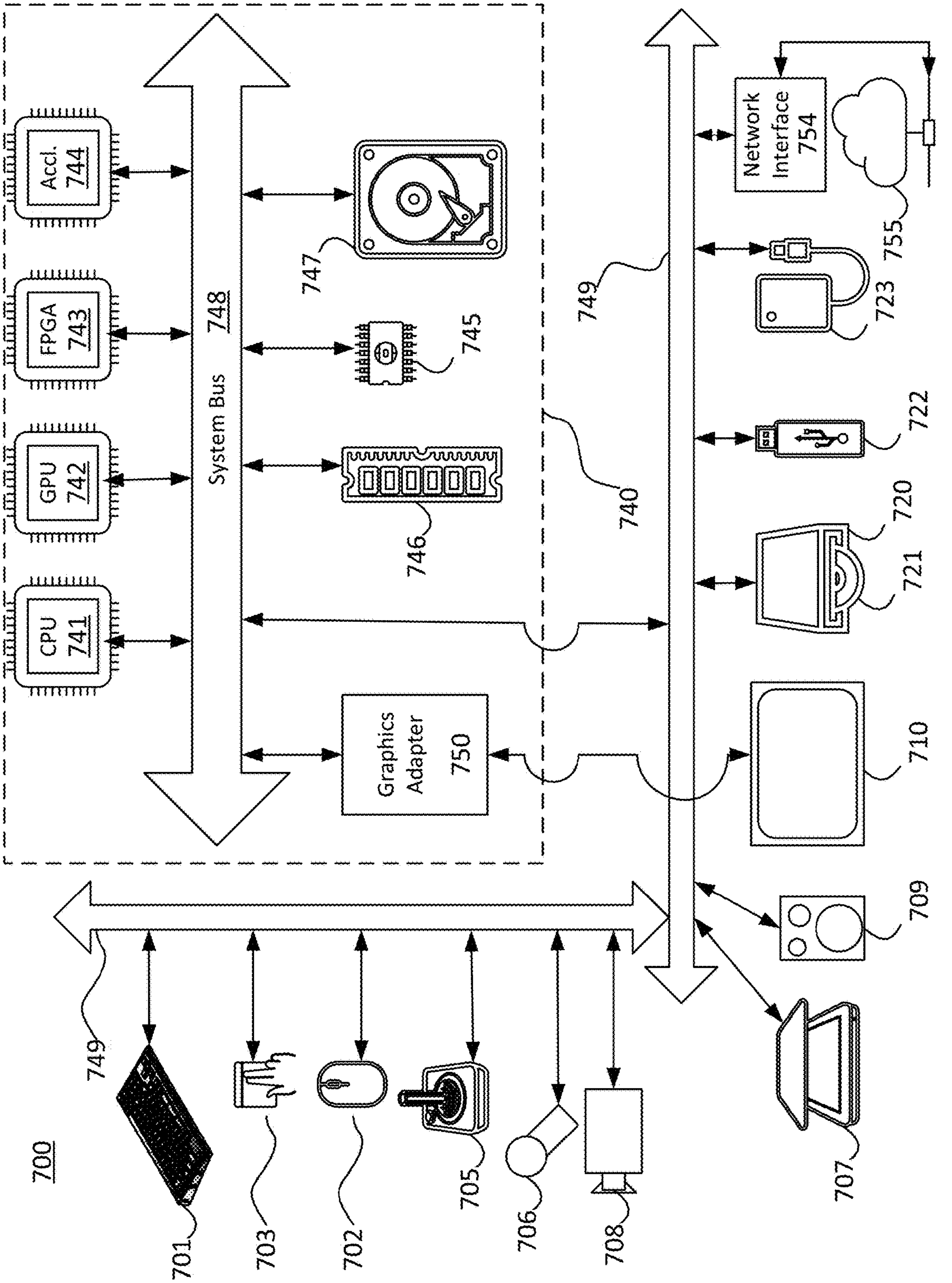
FIG. 7 is a diagram of a computer system suitable for implementing embodiments.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of training a deep neural-network model jointly for acoustic echo suppression and acoustic howling suppression, the method being executed by at least one processor, the method comprising:

generating a teacher speech signal for training the deep neural-network model based on a input speech from a speech system and at least one reference signal;

training the deep neural-network model jointly for acoustic echo suppression and acoustic howling suppression based on the teacher speech signal, a first loss that includes time-domain scale-invariance signal-to-distortion ratio (SI-SDR) loss and frequency-domain mean absolute error (MAE), and a correlation loss that includes a similarity between estimated signal and target signal and a similarity between a playback signal and a residual signal in the target signal, wherein training the deep neural-network model for acoustic echo suppression and acoustic howling suppression comprises identifying a recursive feedback suppression problem for suppressing acoustic echo and acoustic howling into a speech separation problem; and suppressing acoustic echo and acoustic howling in a hybrid meeting while the hybrid meeting is ongoing based on the deep neural-network model jointly for acoustic echo suppression and acoustic howling suppression.

2. The method of claim 1, wherein generating the teacher speech signal comprises:

receiving a training speech signal, the training speech signal comprising training target speech, a first reference signal, and a second reference signal;

based on the training speech signal, generating normalized log-power spectra (LPS) associated with the training speech signal, correlation matrix across time and frequency associated with the training speech signal, and channel covariance associated with the training speech signal; and concatenating the normalized LPS associated with the training speech signal, the correlation matrix across time and frequency associated with the training speech signal, and the channel covariance associated with the training speech signal.

3. The method of claim 2, wherein generating the teacher speech signal further comprises:

generating an intermediate training target speech, an intermediate first reference signal, and an intermediate second reference signal based on the concatenation; and generating the teacher speech signal based on the training speech signal, the intermediate training target speech, the intermediate first reference signal, and the intermediate second reference signal.

4. The method of claim 2, wherein the first reference signal is a background speech signal, and the second reference signal is an echo signal.

5. The method of claim 1, wherein the deep neural-network model is trained to separate the teacher speech signal into an estimated target speech and at least one estimated reference signal.

6. The method of claim 1, wherein the hybrid meeting is a meeting occurring in a physical location and being live-stream simultaneously.

7. An apparatus for training a deep neural-network model jointly for acoustic echo suppression and acoustic howling suppression, the apparatus comprising:

at least one memory configured to store program code; and at least one processor configured to read the program code and operate as instructed by the program code, the program code including:

first generating code configured to cause the at least one processor to generate a teacher speech signal for training the deep neural-network model based on a input speech from a speech system and at least one reference signal;

first training code configured to cause the at least one processor to train the deep neural-network model jointly for acoustic echo suppression and acoustic howling suppression based on the teacher speech signal, a first loss that includes time-domain scale-invariance signal-to-distortion ratio (SI-SDR) loss and frequency-domain mean absolute error (MAE), and a correlation loss that includes a similarity between estimated signal and target signal and a similarity between a playback signal and a residual signal in the target signal, wherein the training the deep neural-network for acoustic echo suppression and acoustic howling suppression comprises identifying a recursive feedback suppression problem for suppressing acoustic echo and acoustic howling into a speech separation problem; and suppressing code configured to cause the at least one processor to suppress acoustic echo and acoustic howling in a hybrid meeting while the hybrid meeting is ongoing based on the deep neural-network model jointly for acoustic echo suppression and acoustic howling suppression.

8. The apparatus of claim 7, wherein the first generating code comprises:

first receiving code configured to cause the at least one processor to receive a training speech signal, the training speech signal comprising training target speech, a first reference signal, and a second reference signal;

second generating code configured to cause the at least one processor to generate, based on the training speech signal, normalized log-power spectra (LPS) associated with the training speech signal, correlation matrix across time and frequency associated with the training speech signal, and channel covariance associated with the training speech signal; and concatenating code configured to cause the at least one processor to concatenate the normalized LPS associated with the training speech signal, the correlation matrix across time and frequency associated with the training speech signal, and the channel covariance associated with the training speech signal.

9. The apparatus of claim 8, wherein the first generating code comprises:

third generating code configured to cause the at least one processor to generate an intermediate training target speech, an intermediate first reference signal, and an intermediate second reference signal based on the concatenation; and fourth generating code configured to cause the at least one processor to generate the teacher speech signal based on the training speech signal, the intermediate training target speech, the intermediate first reference signal, and the intermediate second reference signal.

10. The apparatus of claim 8, wherein the first reference signal is a background speech signal, and the second reference signal is an echo signal.

11. The apparatus of claim 7, wherein the deep neural-network model is trained to separate the teacher speech signal into an estimated target speech and at least one estimated reference signal.

12. The apparatus of claim 7, wherein the hybrid meeting is a meeting occurring in a physical location and being live-stream simultaneously.

13. A non-transitory computer-readable medium storing instructions, the instructions comprising: one or more instructions that, when executed by one or more processors of a device for training a deep neural-network model jointly for acoustic echo suppression and acoustic howling suppression, cause the one or more processors to:

generate a teacher speech signal for training the deep neural-network model based on a input speech from a speech system and at least one reference signal;

train the deep neural-network model jointly for acoustic echo suppression and acoustic howling suppression based on the teacher speech signal, a first loss that includes time-domain scale-invariance signal-to-distortion ratio (SI-SDR) loss and frequency-domain mean absolute error (MAE), and a correlation loss that includes a similarity between estimated signal and target signal and a similarity between a playback signal and a residual signal in the target signal, wherein training the deep neural-network model for acoustic echo suppression and acoustic howling suppression comprises identifying a recursive feedback suppression problem for suppressing acoustic echo and acoustic howling into a speech separation problem; and suppress acoustic echo and acoustic howling in a hybrid meeting while the hybrid meeting is ongoing based on the deep neural-network model jointly for acoustic echo suppression and acoustic howling suppression.

14. The non-transitory computer-readable medium of claim 13, wherein generating the teacher speech signal comprises:

receive a training speech signal, the training speech signal comprising training target speech, a first reference signal, and a second reference signal;

based on the training speech signal, generate normalized log-power spectra (LPS) associated with the training speech signal, correlation matrix across time and frequency associated with the training speech signal, and channel covariance associated with the training speech signal; and concatenate the normalized LPS associated with the training speech signal, the correlation matrix across time and frequency associated with the training speech signal, and the channel covariance associated with the training speech signal.

15. The non-transitory computer-readable medium of claim 14, wherein generating the teacher speech signal comprises:

generate an intermediate training target speech, an intermediate first reference signal, and an intermediate second reference signal based on the concatenation; and generate the teacher speech signal based on the training speech signal, the intermediate training target speech, the intermediate first reference signal, and the intermediate second reference signal.

16. The non-transitory computer-readable medium of claim 14, wherein the first reference signal is a background speech signal, and the second reference signal is an echo signal.

17. The non-transitory computer-readable medium of claim 13, wherein the deep neural-network model is trained to separate the teacher speech signal into an estimated target speech and at least one estimated reference signal.

* * * * *